US012330906B2

(12) United States Patent
Yeddi et al.

(10) Patent No.: US 12,330,906 B2
(45) Date of Patent: Jun. 17, 2025

(54) SYSTEM AND METHOD FOR PRIORITIZING SERVICE TO REMOTE ELEVATOR CALLS BASED ON PROXIMITY TO ELEVATOR LOBBY

(71) Applicant: OTIS ELEVATOR COMPANY, Farmington, CT (US)

(72) Inventors: Naveen Kumar Yeddi, Telangana (IN); Rajinikanth Pusala, Telangana (IN); Tejas Arunrao Dhumal, Maharashtra (IN); Aditya Swami, Hyderabad (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1640 days.

(21) Appl. No.: 16/658,543

(22) Filed: Oct. 21, 2019

(65) Prior Publication Data
US 2020/0122958 A1 Apr. 23, 2020

(30) Foreign Application Priority Data

Oct. 22, 2018 (IN) .............................. 201811039795

(51) Int. Cl.
B66B 1/24 (2006.01)
B66B 1/34 (2006.01)
(Continued)

(52) U.S. Cl.
CPC .......... *B66B 1/2408* (2013.01); *B66B 1/3461* (2013.01); *B66B 1/468* (2013.01);
(Continued)

(58) Field of Classification Search
CPC ............ B66B 1/468; B66B 2201/4653; B66B 1/3461; B66B 2201/4615;
(Continued)

(56) References Cited

U.S. PATENT DOCUMENTS 5,952,626 A 9/1999 Zaharia
6,889,900 B2 5/2005 Davies et al.
(Continued)

FOREIGN PATENT DOCUMENTS

CN 104276462 A 1/2015
CN 105366458 A 3/2016
(Continued)

OTHER PUBLICATIONS

Office Action for Chinese Application No. 201910999988.X issued Mar. 2, 2022.
(Continued)

*Primary Examiner* — Jeffrey Donels
(74) *Attorney, Agent, or Firm* — CANTOR COLBURN LLP

(57) ABSTRACT

Disclosed is an elevator system for a building including an elevator and an elevator controller for communicating with a plurality of smart devices for passengers disposed on building levels, the controller rendering determinations including: a first determination that the controller receives from the smart devices requests for elevator service, a second determination to effect monitoring of smart devices relative to area limits on the levels, the area limits including the lobbies, a third determination to identify a first group of the smart devices that are within the area limits, a fourth determination to identify a first schedule that prioritizes elevator service within the first group based on a time of placement of elevator service requests, a fifth determination to instruct the elevator to provide elevator service following the first schedule, and wherein the controller effects a first communication in which the controller instructs the elevator to effect the fifth determination.

20 Claims, 3 Drawing Sheets

(51) Int. Cl.
    *B66B 1/46*     (2006.01)
    *H04W 4/33*     (2018.01)
    *H04W 4/80*     (2018.01)
    *H04W 84/18*     (2009.01)

(52) U.S. Cl.
    CPC ......... *H04W 4/33* (2018.02); *B66B 2201/101* (2013.01); *B66B 2201/233* (2013.01); *B66B 2201/4638* (2013.01); *B66B 2201/4653* (2013.01); *H04W 4/80* (2018.02); *H04W 84/18* (2013.01)

(58) Field of Classification Search
    CPC ......... B66B 2201/4638; B66B 5/0012; B66B 1/3446; B66B 2201/103; B66B 3/002; B66B 3/006; B66B 1/3492; B66B 2201/232; B66B 2201/405; B66B 2201/223; B66B 2201/4607; B66B 13/14; B66B 1/00
    See application file for complete search history.

(56) References Cited

U.S. PATENT DOCUMENTS

| | | | |
|---|---|---|---|
| 7,162,233 | B2 | 1/2007 | Chiba |
| 7,552,800 | B2 | 6/2009 | Puskala et al. |
| 8,820,486 | B2 | 9/2014 | Gerstenkorn et al. |
| 8,960,373 | B2 | 2/2015 | De Vincentis |
| 9,878,875 | B1 | 1/2018 | Scoville et al. |
| 9,896,305 | B2 * | 2/2018 | Blandin ............... B66B 1/3461 |
| 9,998,581 | B1 * | 6/2018 | Noxon ............ H04M 1/72412 |
| 10,046,948 | B2 * | 8/2018 | Garfinkel ............... B66B 1/468 |
| 10,197,401 | B1 * | 2/2019 | Hsu ................... G06Q 30/0261 |
| 2015/0291388 | A1 | 10/2015 | Hovi et al. |
| 2016/0122157 | A1 | 5/2016 | Keser |
| 2016/0304312 | A1 | 10/2016 | Thompson |
| 2016/0311647 | A1 * | 10/2016 | Peterson ............... B66B 5/0012 |
| 2017/0088397 | A1 * | 3/2017 | Buckman ........... G06Q 10/1095 |
| 2017/0137255 | A1 | 5/2017 | Simcik et al. |
| 2017/0349402 | A1 | 12/2017 | Chapman et al. |
| 2018/0121072 | A1 | 5/2018 | Baldi et al. |
| 2018/0370761 | A1 * | 12/2018 | Huang ................. H04W 76/10 |
| 2019/0023527 | A1 * | 1/2019 | Larmuseau ........... B66B 1/3461 |
| 2020/0062538 | A1 * | 2/2020 | Hsu ........................ B66B 1/468 |
| 2020/0130987 | A1 * | 4/2020 | Scoville .................. B66B 1/468 |
| 2020/0207572 | A1 * | 7/2020 | Jarugubilli ............. B66B 1/468 |
| 2020/0207577 | A1 * | 7/2020 | Kottur .................. B66B 1/3476 |

FOREIGN PATENT DOCUMENTS

| | | | | |
|---|---|---|---|---|
| CN | 105980285 | A * | 9/2016 | ............ B66B 1/468 |
| CN | 108163654 | A | 6/2018 | |
| CN | 108337654 | A * | 7/2018 | ........... B66B 1/3461 |
| CN | 108975109 | A * | 12/2018 | ............... B66B 1/20 |
| CN | 109110589 | B * | 11/2022 | ............... B66B 1/06 |
| EP | 3285160 | A1 * | 2/2018 | ............ B66B 1/468 |
| EP | 3418236 | A1 * | 12/2018 | |
| EP | 3566991 | A1 * | 11/2019 | ............... B66B 1/06 |
| EP | 3674240 | A1 * | 7/2020 | ........... B66B 1/2408 |
| WO | WO-2014118424 | A1 * | 8/2014 | ............... B66B 1/46 |
| WO | 2017175019 | A1 | 10/2017 | |
| WO | WO-2017175021 | A1 * | 10/2017 | .......... B66B 1/2408 |
| WO | WO-2019015642 | A1 * | 1/2019 | ........... B66B 1/3461 |

OTHER PUBLICATIONS

Kwon, O. et al. "Sensor-aware elevator scheduling for smart building environments", Building and Environment, 2014, vol. 72, pp. 332-342, Abstract Only.
CN OA Issued Sep. 28, 2021, 9 pages.
OA Issued Sep. 28, 2021.
European Search Report; Application No. 19204715.7; dated Apr. 9, 2020; 5 pages.

* cited by examiner

SYSTEM AND METHOD FOR PRIORITIZING SERVICE TO REMOTE ELEVATOR CALLS BASED ON PROXIMITY TO ELEVATOR LOBBY

CROSS-REFERENCE TO RELATED APPLICATIONS

This application claims the benefit of Indian Application No. 201811039795, filed Oct. 22, 2018, the disclosure of which is incorporated herein by reference in its entirety.

BACKGROUND

The embodiments herein relate to elevators and more specifically to a system and method for prioritizing service for remote elevator calls based on proximity to an elevator lobby.

Elevator users may be able to request elevator calls remotely. Users may be unable to utilize the requested service after the request because of various reasons. In addition, as a person may be relatively far from an elevator lobby, an elevator car responding to an elevator call may arrived at an empty lobby. Thus serving the elevator based on such request is inefficient because it may waste power and create undue delays for other passengers.

SUMMARY

Disclosed is an elevator system for a building that includes a plurality of levels having a respective plurality of lobbies, the system comprising an elevator and an elevator controller capable of controlling the elevator and communicating with a plurality of smart devices for a respective plurality of passengers disposed on the respective plurality of levels, wherein the controller renders a plurality of determinations including: a first determination that the controller receives from the plurality of smart devices a respective plurality of requests for elevator service, a second determination to effect monitoring of the plurality of smart devices relative to a plurality of area limits on the respective plurality of levels, the plurality of area limits including the respective plurality of lobbies, a third determination to identify a first group of the plurality of smart devices that are within the respective plurality of area limits, a fourth determination to identify a first schedule that prioritizes elevator service within the first group based on a time of placement of respective elevator service requests, a fifth determination to instruct the elevator to provide elevator service following the first schedule, and wherein the controller effects a first communication in which the controller instructs the elevator to effect the fifth determination.

In addition to one more of the above disclosed features or as an alternate the controller continually repeats at least the fourth determination and upon detecting a change in the first schedule, the controller repeats effecting the first communication.

In addition to one more of the above disclosed features or as an alternate the controller effects a plurality of communications including the first communication and a second communication in which the controller instructs the first group to display a least a portion of the first schedule.

In addition to one more of the above disclosed features or as an alternate when a first subgroup of one or more smart devices is removed from the first group for leaving the respective one or more area limits, the controller effects a second communication in which the controller instructs the first subgroup to display that elevator service is cancelled.

In addition to one more of the above disclosed features or as an alternate the second communication includes navigational directions for the first subgroup for returning to the respective one or more area limits.

In addition to one more of the above disclosed features or as an alternate the plurality of smart devices are a respective plurality of smart phones.

In addition to one more of the above disclosed features or as an alternate the controller communicates with the plurality of smart devices over a personal area network (PAN).

In addition to one more of the above disclosed features or as an alternate system includes a plurality of telecommunication beacons is disposed proximate the respective plurality of lobbies for effecting paring between the controller and the plurality of smart devices over the PAN.

In addition to one more of the above disclosed features or as an alternate the plurality of smart devices include a respective plurality of Global Positioning System (GPS) implements and the controller effects monitoring of the plurality of smart devices by analyzing one or more of GPS data and PAN communications.

In addition to one more of the above disclosed features or as an alternate the controller effects monitoring of the plurality of smart devices by determining a respective plurality of indoor positions for the smart devices with geomagnetic positioning data.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
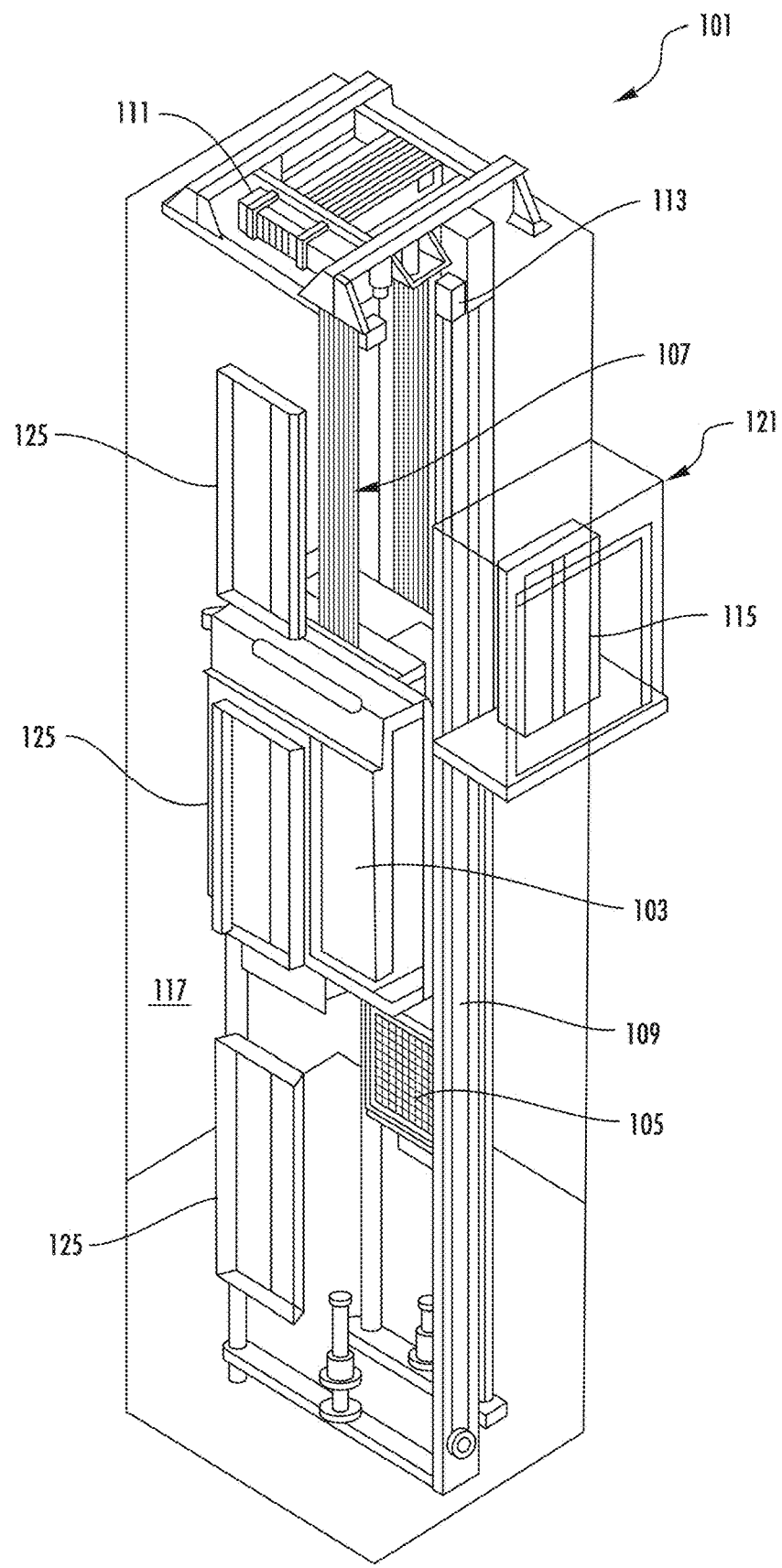
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator hoistway 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator hoistway 117, such as on a support or guide rail, and may be configured to provide position signals related to a position of the elevator car 103 within the elevator hoistway 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator hoistway 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator hoistway 117 along guide rail 109, the elevator car 103 may stop at one or more lobbies 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator hoistway 117.

Although shown and described with a roping system including tension member 107, elevator systems that employ other methods and mechanisms of moving an elevator car within an elevator hoistway may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
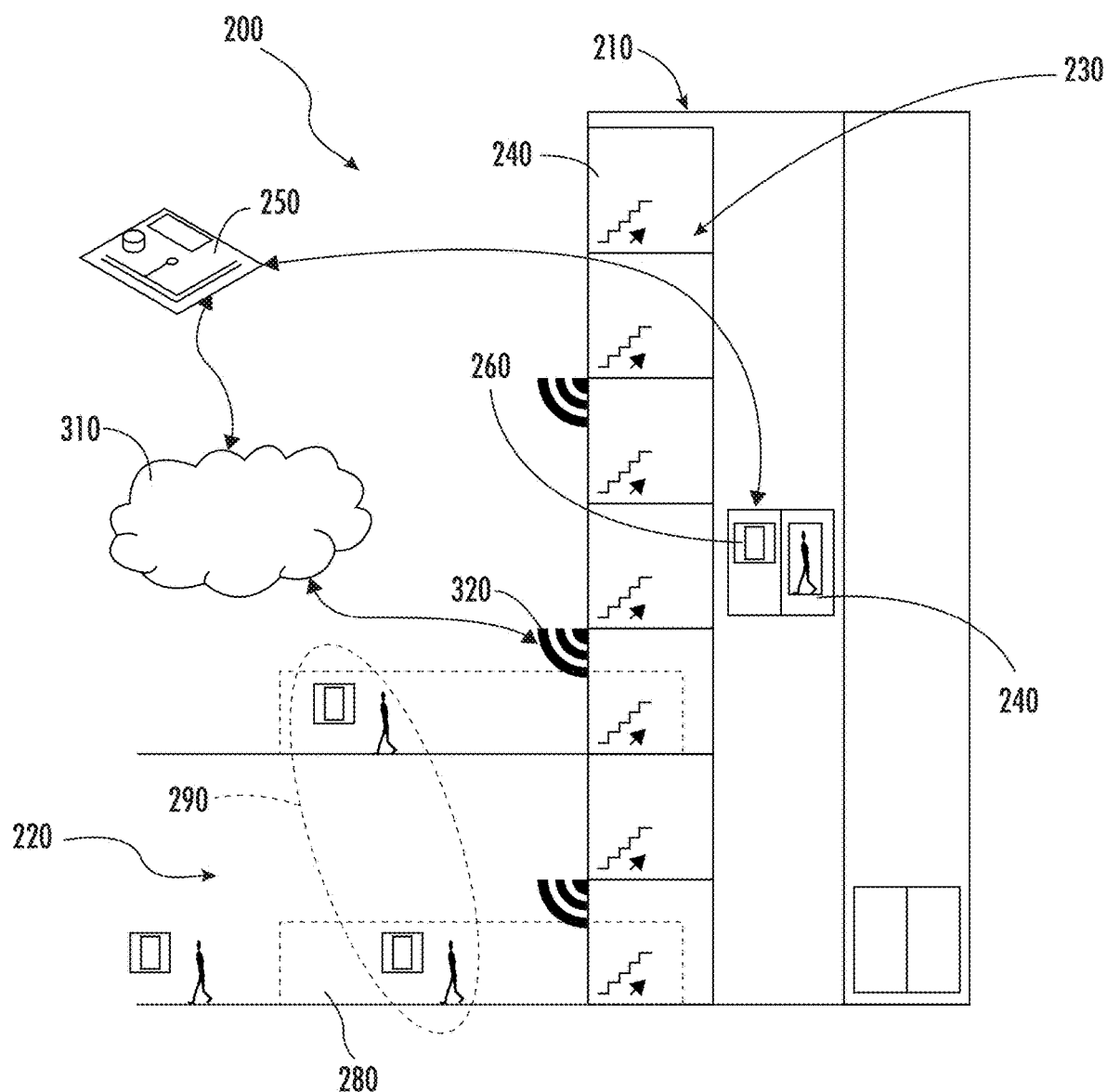
FIG. 2 illustrates additional features associates with one or more disclosed embodiments.

Turning to FIG. 2, disclosed is an elevator system 200 for a building 210 that includes a plurality of levels 220 having a respective plurality of lobbies 230. The system may comprise an elevator car 240 and an elevator controller 250 capable of controlling the elevator car 240. The controller 250 may be capable of communicating with a plurality of smart devices 260 for a respective plurality of passengers 270 disposed on the respective plurality of levels 220.

Figure 3:
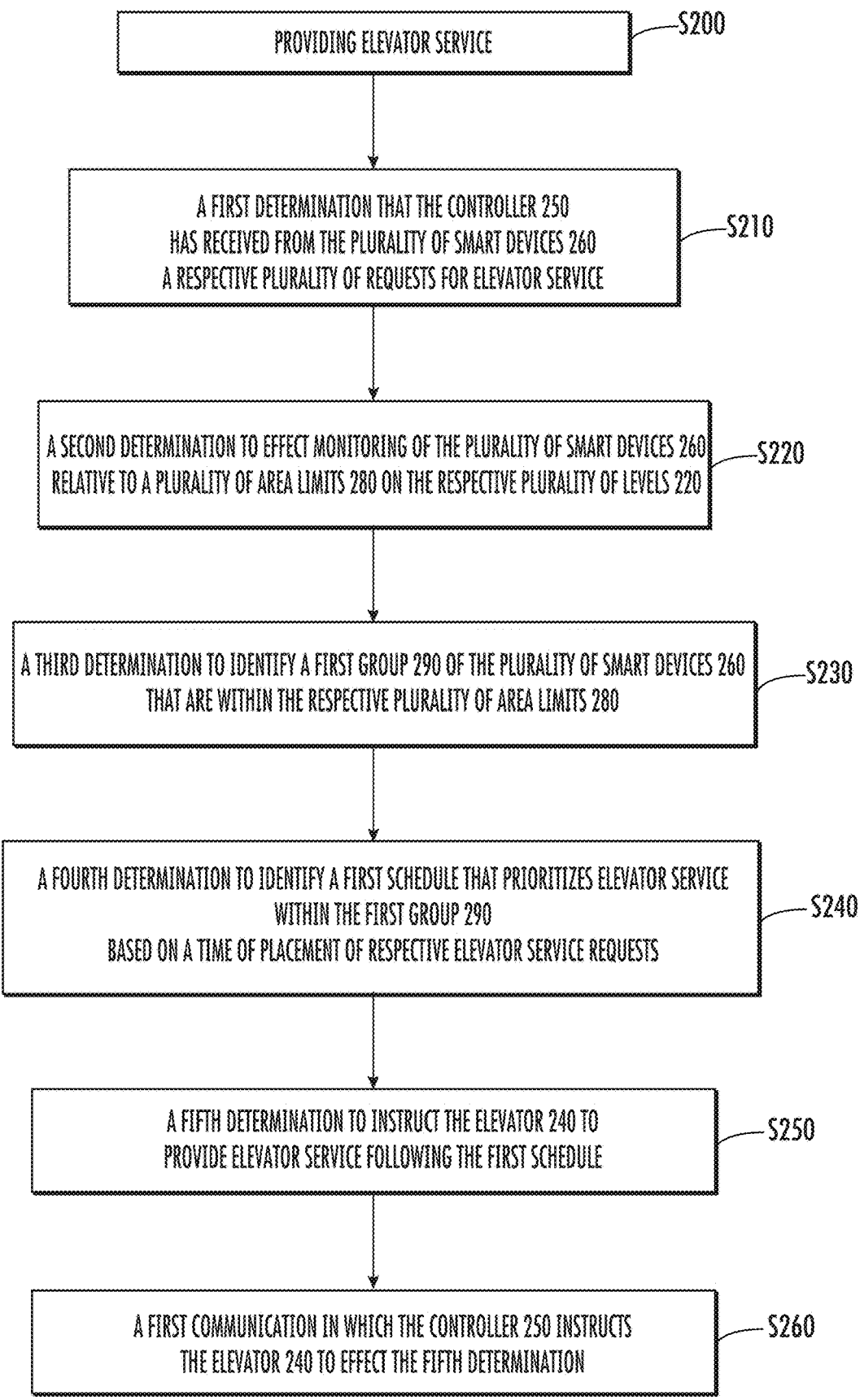
FIG. 3 illustrates a process associated with one or more disclosed embodiments.

Turning to FIG. 3, the controller 250 renders a plurality of determinations in a process S200 of providing elevator service. S200 includes step S210 of the controller 250 rendering a first determination that the controller 250 has received from the plurality of smart devices 260 a respective plurality of requests for elevator service. At step S220 the controller 250 renders a second determination to effect monitoring of the plurality of smart devices 260 relative to a plurality of area limits 280 on the respective plurality of levels 220.

The plurality of area limits 280 may include the respective plurality of lobbies 230. At step S230 the controller 250 renders a third determination to identify a first group 290 of the plurality of smart devices 260 that are within the respective plurality of area limits 280. At step S240 the controller 250 renders a fourth determination to identify a first schedule that prioritizes elevator service within the first group 290 based on a time of placement of relative elevator service requests. At step S250 the controller 250 renders a fifth determination to instruct the elevator car 240 to provide elevator service following the first schedule. At step S260 the controller 250 effects a first communication in which the controller 250 instructs the elevator car 240 to effect the fifth determination.

According to an embodiment the controller 250 continually repeats at least the fourth determination and upon detecting a change in the first schedule, the controller 250 repeats effecting the first communication. According to an embodiment the controller 250 effects a plurality of communications including the first communication and a second communication in which the controller 250 instructs the first group 290 to display a least a portion of the first schedule. That is, each smart device in the first group would display at list its order within the first schedule so as to inform the relevant passenger to move toward the elevator.

According to an embodiment when a first subgroup 300 of one or more smart devices 260 is removed from the first group 290 for leaving the respective one or more area limits 280, the controller 250 effects a second communication. In the second communication the controller 250 may instruct the first subgroup 300 to display that elevator service is cancelled. According to an embodiment the second communication includes navigational directions for the first subgroup 300 for returning to the respective one or more area limits 280.

According to an embodiment the plurality of smart devices 260 may be a respective plurality of smart phones. According to an embodiment the controller 250 may communicate with the plurality of smart devices over a personal area network (PAN) 310. According to an embodiment a plurality of telecommunication beacons 320 are disposed proximate the respective plurality of lobbies 230 for effecting paring between the controller 250 and the plurality of smart devices 260 over the PAN 310.

According to an embodiment the plurality of smart devices 260 include a respective plurality of Global Positioning System (GPS) implements, such as microchips, and the controller 250 may effect monitoring of the plurality of smart devices 260 by analyzing one or more of GPS data and PAN communications. According to an embodiment the PAN is Bluetooth.

In addition, according to an embodiment an indoor position of the plurality passengers 270 within the respective plurality of area limits 280 may be identified with geomagnetic position data (discussed in greater detail below). With this data, the controller 250 may render a determinization of a plurality of routes by which the respective plurality passengers 270 may travel to reach the respective plurality lobbies 230. The controller 250 may also render a determination of a plurality of travel times for the respective plurality passengers 270 to reach the respective plurality of lobbies 230. With this information the controller 270 may prioritize passenger pickup based on the respective plurality of indoor positions and/or travel times for the respective plurality of passengers 270.

According to the above disclosure, upon a user making a remote elevator call, a system may register the call and an associated time for the call, assign responsive elevator information to the user prioritized by time of call placement, and monitors an area around the elevator to determine whether the user is within the area. If the user is not within the area and/or does not enter the area, the system may cancel the call request. If the user is within the area and/or enters the area, the request may be served in the prioritized order. To track the user, the system may utilize, for example, a GPS service available to the user.

The above disclosure may provide for effective utilization of an elevator system by reducing the power consumption of the elevator system. That is elevators may be assigned when a user is in proximate a requested call floor. As such the elevator system may reduce the wait and travel time for passengers.

Geomagnetic positioning as referend above is a solution that may be implemented when passengers with the smart device are within the building. With geomagnetic positioning, a controller may pinpoint the passengers' indoor location without the need to install additional infrastructures such as beacons or Wi-Fi transceivers. Buildings have a unique magnetic landscape produced by the earth's magnetic field that interacts with steel and other materials found in structures of buildings. By utilizing the built-in magnetic sensor (a compass) as well as sensing technologies within a smartphone, a magnetic field inside the building maybe used as a map to accurately pinpoint and track a person's location indoors, with near accuracy. The technology may require an execution of five steps: (1) create or obtain a building floor plan, (2) fingerprint/map the floorplan with geomagnetic sensor data, (3) map the sensor data with GPS coordinates for the building, (4) provide a unique identifier to a smartphone for tracking the smartphone using it's geomagnetic position, and (5) obtain the effective location on a GPS coordinate map of the location of the smartphone.

As used herein, "smart devices" may contain one or more processors capable of communication using with other such devices by applying wired and/or wireless telecommunication protocols. Non-limiting examples of a smart device include a mobile phone, personal data assistant (PDA), tablet, watch, wearable or other processor-based devices. Protocols applied by smart devices may include local area network (LAN) protocols and/or a private area network (PAN) protocols. LAN protocols may apply Wi-Fi technology, which is a technology based on the Section 802.11 standards from the Institute of Electrical and Electronics Engineers, or IEEE. PAN protocols include, for example, Bluetooth Low Energy (BTLE), which is a wireless technology standard designed and marketed by the Bluetooth Special Interest Group (SIG) for exchanging data over short distances using short-wavelength radio waves. PAN protocols may also include Zigbee, a technology based on Section 802.15.4 protocols from the Institute of Electrical and Electronics Engineers (IEEE). More specifically, Zigbee represents a suite of high-level communication protocols used to create personal area networks with small, low-power digital radios for low-power low-bandwidth needs, and is best suited for small scale projects using wireless connections. Wireless protocols may further include short range communication (SRC) protocols, which may be utilized with radiofrequency identification (RFID) technology. RFID may be used for communicating with an integrated chip (IC) on an RFID smartcard. Wireless protocols may further include long range, low powered wide area network (LoRa and LPWAN) protocols that enable low data rate communications to be made over long distances by sensors and actuators for machine-to-machine (M2M) and Internet of Things (IoT) applications.

As described above, embodiments can be in the form of processor-implemented processes and devices for practicing those processes, such as a processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. An elevator system for a building that includes a plurality of levels having a respective plurality of lobbies, the system comprising an elevator and an elevator controller capable of controlling the elevator and communicating with a plurality of smart devices for a respective plurality of passengers disposed on the respective plurality of levels, wherein the controller renders a plurality of determinations including:

a first determination that the controller receives from the plurality of smart devices a respective plurality of requests for elevator service, a second determination to effect monitoring of the plurality of smart devices relative to a plurality of area limits on the respective plurality of levels, the plurality of area limits including the respective plurality of lobbies, a third determination to identify a first group of the plurality of smart devices that are within the respective plurality of area limits, a fourth determination to identify a first schedule that prioritizes elevator service within the first group based on a time of placement of respective elevator service requests, a fifth determination to instruct the elevator to provide elevator service following the first schedule, and wherein the controller effects a first communication in which the controller instructs the elevator to effect the fifth determination.

2. The system of claim 1 wherein the controller continually repeats at least the fourth determination and upon detecting a change in the first schedule, the controller repeats effecting the first communication.

3. The system of claim 2 wherein the controller effects a plurality of communications including the first communication and a second communication in which the controller instructs the first group to display a least a portion of the first schedule.

4. The system of claim 3 wherein when a first subgroup of one or more smart devices is removed from the first group for leaving the respective one or more area limits, the controller effects a second communication in which the controller instructs the first subgroup to display that elevator service is cancelled.

5. The system of claim 4 wherein the second communication includes navigational directions for the first subgroup for returning to the respective one or more area limits.

6. The system of claim 5 wherein the plurality of smart devices are a respective plurality of smart phones.

7. The system of claim 6 wherein the controller communicates with the plurality of smart devices over a personal area network (PAN).

8. The system of claim 7 comprising a plurality of telecommunication beacons is disposed proximate the respective plurality of lobbies for effecting paring between the controller and the plurality of smart devices over the PAN.

9. The system of claim 8 wherein the plurality of smart devices include a respective plurality of Global Positioning System (GPS) implements and the controller effects monitoring of the plurality of smart devices by analyzing one or more of GPS data and PAN communications.

10. The system of claim 5 wherein the controller effects monitoring of the plurality of smart devices by determining a respective plurality of indoor positions for the smart devices with geomagnetic positioning data.

11. A method of transporting passengers in a building with an elevator system, wherein the building includes a plurality of levels having a respective plurality of lobbies, and system includes an elevator and an elevator controller capable of controlling the elevator and communicating with a plurality of smart devices for a respective plurality of passengers disposed on the respective plurality of levels, the method comprising the controller rendering a plurality of determinations including:

a first determination that the controller receives from the plurality of smart devices a respective plurality of requests for elevator service, a second determination to effect monitoring of the plurality of smart devices relative to a plurality of area limits on the respective plurality of levels, the plurality of area limits including the respective plurality of lobbies, a third determination to identify a first group of the plurality of smart devices that are within the respective plurality of area limits, a fourth determination to identify a first schedule that prioritizes elevator service within the first group based on a time of placement of respective elevator service requests, a fifth determination to instruct the elevator to provide elevator service following the first schedule, and the controller effecting a first communication in which the controller instructs the elevator to effect the fifth determination.

12. The method of claim 11 wherein the controller continually repeats at least the fourth determination and upon detecting a change in the first schedule, the controller repeats effecting the first communication.

13. The method of claim 12 wherein the controller effects a plurality of communications including the first communication and a second communication in which the controller instructs the first group to display a least a portion of the first schedule.

14. The method of claim 13 wherein when a first subgroup of one or more smart devices is removed from the first group for leaving the respective one or more area limits, the controller effects a second communication in which the controller instructs the first subgroup to display that elevator service is cancelled.

15. The method of claim 14 wherein the second communication includes navigational directions for the first subgroup for returning to the respective one or more area limits.

16. The method of claim 15 wherein the plurality of smart devices are a respective plurality of smart phones.

17. The method of claim 16 wherein the controller communicates with the plurality of smart devices over a personal area network (PAN).

18. The method of claim 17 comprising a plurality of telecommunication beacons is disposed proximate the respective plurality of lobbies for effecting paring between the controller and the plurality of smart devices over the PAN.

19. The method of claim 18 wherein the plurality of smart devices include a respective plurality of Global Positioning System (GPS) implements and the controller effects monitoring of the plurality of smart devices by analyzing one or more of GPS data and PAN communications.

20. The method of claim 15 wherein the controller effects monitoring of the plurality of smart devices by determining a respective plurality of indoor positions for the smart devices with geomagnetic positioning data.

* * * * *